United States Patent
Valente et al.

(10) Patent No.: US 8,774,273 B2
(45) Date of Patent: Jul. 8, 2014

(54) METHOD AND SYSTEM FOR DECODING DIGITAL VIDEO CONTENT INVOLVING ARBITRARILY ACCESSING AN ENCODED BITSTREAM

(75) Inventors: Stephane E. Valente, Paris (FR); Hugues J. M. De Perthuis, Garcelles (FR)

(73) Assignee: Entropic Communications, Inc., San Diego, CA (US)

( * ) Notice: Subject to any disclaimer, the term of this patent is extended or adjusted under 35 U.S.C. 154(b) by 569 days.

(21) Appl. No.: 12/681,564

(22) PCT Filed: Oct. 6, 2008

(86) PCT No.: PCT/IB2008/054086
§ 371 (c)(1),
(2), (4) Date: Aug. 16, 2010

(87) PCT Pub. No.: WO2009/047695
PCT Pub. Date: Apr. 16, 2009

(65) Prior Publication Data
US 2010/0303152 A1    Dec. 2, 2010

(30) Foreign Application Priority Data
Oct. 8, 2007   (EP) .................................... 07291224

(51) Int. Cl.
*H04N 7/12*    (2006.01)
(52) U.S. Cl.
USPC .................................................... 375/240.12
(58) Field of Classification Search
None
See application file for complete search history.

(56) References Cited

U.S. PATENT DOCUMENTS

| | | | |
|---|---|---|---|
| 7,245,242 B2 * | 7/2007 | Hu et al. | 341/107 |
| 7,289,562 B2 * | 10/2007 | Yan et al. | 375/240.03 |
| 2002/0041714 A1 * | 4/2002 | Ishida et al. | 382/233 |
| 2004/0066852 A1 * | 4/2004 | MacInnis | 375/240.25 |
| 2005/0289631 A1 | 12/2005 | Shoemake | |
| 2006/0126744 A1 * | 6/2006 | Peng et al. | 375/240.26 |
| 2007/0183491 A1 * | 8/2007 | Pearson et al. | 375/240 |

FOREIGN PATENT DOCUMENTS

| | | |
|---|---|---|
| EP | 1191795 A2 | 3/2002 |
| EP | 1478186 A2 | 11/2004 |

OTHER PUBLICATIONS

International Search Report for PCT/IB2008/054086 mailed Mar. 16, 2009.

* cited by examiner

*Primary Examiner* — Sath V Perungavoor
*Assistant Examiner* — Kate Luo
(74) *Attorney, Agent, or Firm* — Richard Bachand; Duane Morris LLP

(57) ABSTRACT

A technique for decoding an encoded bitstream of digital video content involves decoding a bitstream, wherein decoding the bitstream generates decoded syntax elements and decoded pixel information, creating an access point in the currently decoded bitstream by saving state information related to the decoding, saving the decoded syntax elements, and saving the decoded pixel information, and synchronizing a subsequent decoding operation to the access point utilizing the saved state information, the saved decoded syntax elements, and the saved decoded pixel information.

9 Claims, 7 Drawing Sheets

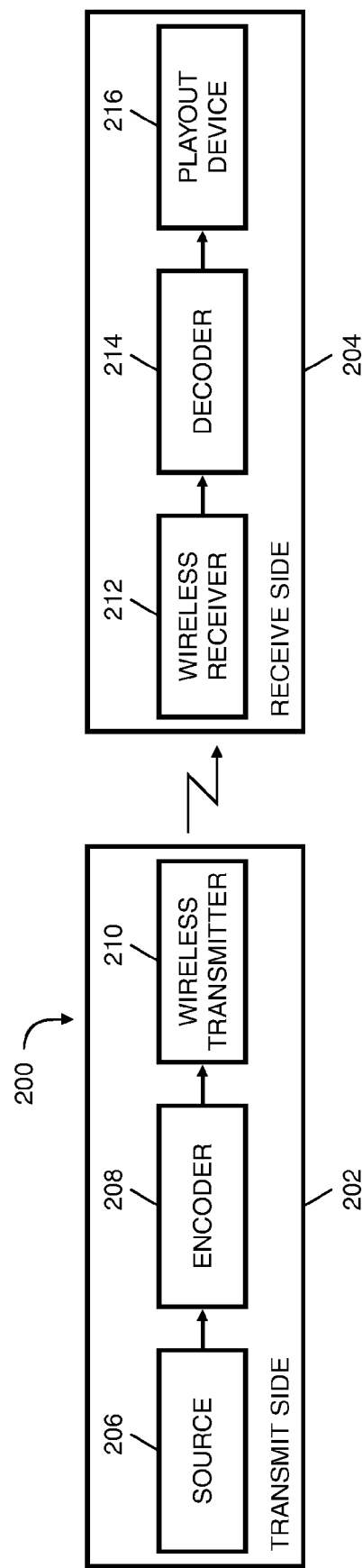

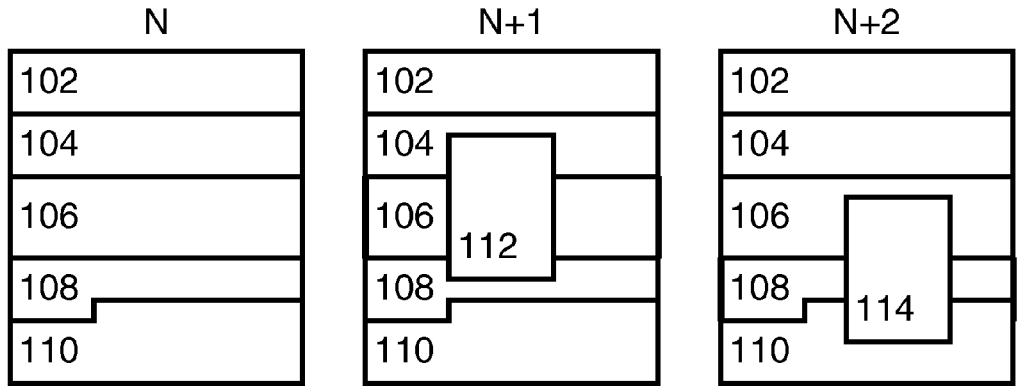
FIG. 2A
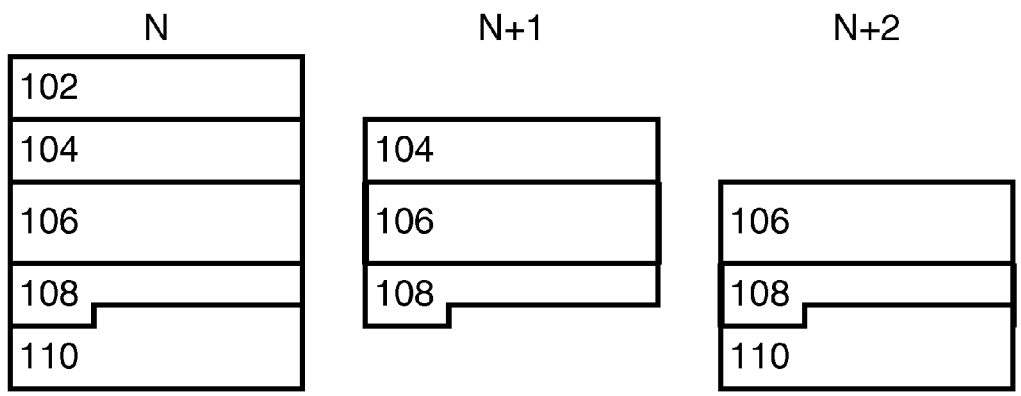
FIG. 2B
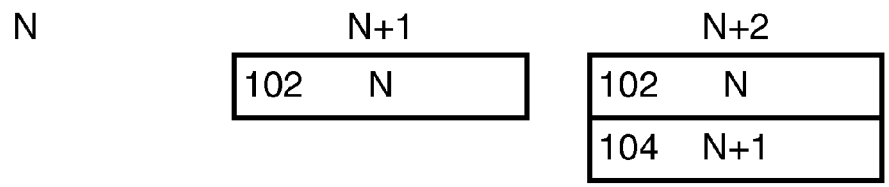
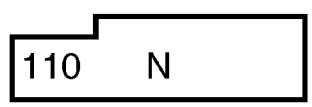
FIG. 2C

METHOD AND SYSTEM FOR DECODING DIGITAL VIDEO CONTENT INVOLVING ARBITRARILY ACCESSING AN ENCODED BITSTREAM

FIELD OF THE INVENTION

The invention relates generally to wireless communications systems, and more particularly, to managing the decoding of digital video content that has been wirelessly transmitted.

BACKGROUND OF THE INVENTION

Radio frequency wireless technologies are being developed to enable the wireless distribution of rich digital video content within a local environment such as a home or office. For example, the WiMedia Alliance has developed the WiMedia Ultra-Wideband (UWB) Common Radio Platform, which incorporates media access control (MAC) layer and physical (PHY) layer specifications based on Multi-band Orthogonal Frequency Division Multiplexing (MB-OFDM). The WiMedia UWB Common Radio Platform enables shortrange multimedia file transfers at data rates of 480 Mbit/s and beyond with low power consumption using the 3.1 to 10.6 GHz UWB spectrum. WiMedia UWB Common Radio Platform is optimized for the personal computers (PCs), consumer electronic (CE) devices, mobile devices, and automotive applications.

SUMMARY OF THE INVENTION

Although wireless technologies such as WiMedia UWB Common Radio Platform exist for distributing digital video content within a local environment, such technologies typically require extensive encoding and decoding of digital video content. The extensive encoding and decoding is typically accomplished using brut force processing power, large amounts of high-speed random access memory (RAM), and wide data buses, all of which add cost to the components that are required to support the wireless distribution of digital video content.

A technique, in accordance with an embodiment of the invention, for decoding an encoded bitstream of digital video content involves decoding a bitstream, wherein decoding the bitstream generates decoded syntax elements and decoded pixel information, creating an access point in the currently decoded bitstream by saving state information related to the decoding, saving the decoded syntax elements, and saving the decoded pixel information, and synchronizing a subsequent decoding operation to the access point utilizing the saved state information, the saved decoded syntax elements, and the saved decoded pixel information.

In an embodiment in accordance with the invention, a decoder includes an entropy decoder and an arbitrary access engine connected to the entropy decoder. The entropy decoder is configured to decode an encoded bitstream, whereby the process of decoding the encoded bitstream causes changes in state within the entropy decoder. The arbitrary access engine is configured to create access points in the encoded bitstream that is decoded by the entropy decoder. The access points are a collection of information that allows the decoder to arbitrarily access the encoded bitstream for subsequent decoding by the entropy decoder. In an embodiment, state information of the entropy decoder, decoded syntax elements, and decoded pixel information are saved in a memory, such as an external memory and/or internal memory, to create an access point. To synchronize the decoder with a reference bitstream, the saved state information, the saved decoded syntax elements, and the saved decoded pixel information is retrieved from the memory. The retrieved state information is provided to the entropy decoder and the retrieved decoded syntax elements and decoded pixel information is provided to the internal memory.

BRIEF DESCRIPTION OF THE DRAWINGS

Other aspects and advantages of the present invention will become apparent from the following detailed description, taken in conjunction with the accompanying drawings, illustrating by way of example the principles of the invention.

FIG. 1 depicts a wireless media communications system that is configured to wirelessly transmit digital video content.

FIG. 2A illustrates a time sequence of I-pictures identified as pictures N, N+1, and N+2, with picture N being first in time, I-picture N+1 being second in time, and I-picture N+2 being third in time.

FIG. 2B illustrates a time sequence of slices that are transmitted across a wireless link to communicate the I-pictures from FIG. 2A.

FIG. 2C illustrates redundant slices that are used as reference slices to decode the I-pictures from FIG. 2A.

Throughout the description, similar reference numbers may be used to identify similar elements.

DETAILED DESCRIPTION OF EMBODIMENTS

Figure 3A:
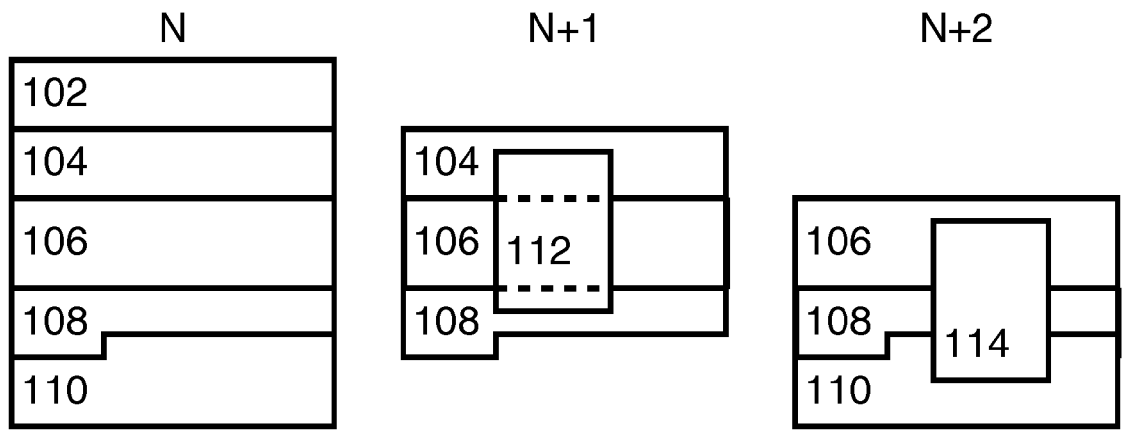
FIGS. 3A and 3B illustrate how macroblock-level redundancy can be exploited to improve wireless transmission of digital video content.

FIG. 1 depicts a wireless media communications system 200 that is configured to wirelessly transmit digital video content as described, for example, in the WiMedia UBW Common Radio Platform. The wireless media communications system includes a transmit side 202 and a receive side 204, with the transmit side having a source 206 of digital video content, an encoder 208, and a wireless transmitter 210 and the receive side having a wireless receiver 212, a decoder 214, and a playout device 216. On the transmit side, the source provides digital video content to the encoder, the encoder encodes the digital video content, and the wireless transmitter transmits the encoded digital video content. On the receive side, the wireless receiver receives the encoded digital video content, the decoder decodes the encoded digital video content, and the playout device plays out the decoded digital video content for viewing and/or recording.

In the embodiment of FIG. 1, wireless communication of digital video content from the transmit side 202 to the receive side 204 uses only intra (I) picture encoding. Using I-picture only encoding does not require any other pictures (e.g., I, P, or B pictures) to be stored by the encoder/decoder for encoding/decoding. In I-picture encoding, encoding (or decoding) a macroblock of 16×16 pixels requires the storage in memory of only the line of pixels located to the left and top boundaries of current macroblocks. In a typical implementation where pixels arrive in scan line order, only one line of a macroblock plus one line of pixels is required to be held in memory for encoding. The small amount of memory can easily and economically be provided by an internal buffer of an encoder.

Typical protocols for encoding digital video content take advantage of redundancies between I, B, and P frames. In I-picture only encoding, it is still possible to take advantage of redundancies that exist between slices of different pictures of the digital video content (i.e., slice-level redundancies) and/or redundancies that exist between macroblocks in the same slice (i.e., macroblock-level redundancies).

FIG. 2A illustrates a time sequence of I-pictures 100 identified as pictures N, N+1, and N+2, with picture N being first in time, I-picture N+1 being second in time, and I-picture N+2 being third in time. Within the I-pictures, individual slices 102, 104, 106, 108, and 110 of digital video content are identified as well as areas of the pictures that have changed from one picture to the next (referred to herein as the "change zone"). For example, from picture N to picture N+1, the change zone in picture N+1 is identified by block 112 and from picture N+1 to N+2, the change zone in picture N+2 is identified by block 114.

Although the change zones are identified as contiguous blocks for description purposes, it should be understood that changes from picture to picture can occur non-contiguously. In an embodiment, slices that do not change over time are identified as containing redundant digital video content. For example, from picture N to picture N+1, there are no changes in slices 102 and 110 and from picture N+1 to N+2, there are no changes in slices 102 and 104. For slices that do not change from one picture to the next, there is an opportunity to save encoding and transmission resources by effectively re-using the redundant slices for decoding at the receive side of the wireless connection. Because redundant slices are re-used for decoding, the redundant slices do not have to be transmitted with every picture. This frees up resources, including encoding resources and transmission bandwidth, which can be put to other uses. For example, certain slices of a picture can be encoded with less compression and more transmission bandwidth can be used for transmission of the slices or more bandwidth can be used for error correction.

FIG. 2B illustrates a time sequence of slices 102, 104, 106, 108, and 110 that are transmitted across a wireless link to communicate the I-pictures 100 from FIG. 2A. In particular, the entire picture N is sent because it is the first picture in the series of pictures and so there is no redundancy with previous pictures. Picture N+1 has two slices 102 and 110 that are redundant with slices of picture N. Because the two slices 102 and 110 are redundant with slices of the previous picture, these slices are not transmitted along with the other slices of picture N+1. Picture N+2 has two slices 102 and 104 that are redundant with slices of picture N+1. Again, because the two slices 102 and 104 are redundant with slices of the previous picture, these slices are not transmitted.

At the receive side of the wireless link, when some slices of an I-picture are not transmitted, the corresponding redundant slices from a previously transmitted I-picture are needed to decode the subsequent pictures. Specifically, the redundant slices of a previous picture that were transmitted to the receive side are stored at the receive side and used as reference slices for the decoding of subsequent pictures. FIG. 2C illustrates redundant slices that are used as reference slices to decode I-pictures. In particular, redundant slices 102 and 110 from picture N are used to decode portions of picture N+1, specifically to decode slice 102 and slice 110 of picture N+1. Likewise, redundant slice 102 from picture N and redundant slice 104 from picture N+1 are used to decode portions of picture N+2, specifically to decode slice 102 and slice 104 of picture N+2.

Figure 3B:
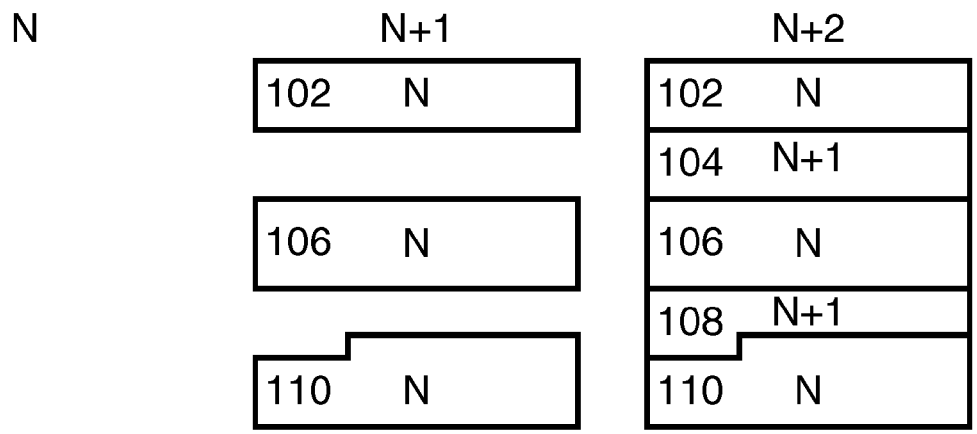

FIGS. 2A-2C illustrate how slice-level redundancy (i.e., redundancies between slices) can be exploited to improve the wireless transmission of digital video content. Redundancies that exist at the macroblock level (i.e., redundancies between macroblocks within the same slice of different pictures) can also be exploited to improve the wireless transmission of digital video content. FIGS. 3A and 3B illustrate how macroblock-level redundancy can be exploited to improve wireless transmission of digital video content.

Assuming the same initial time sequence of I-pictures 100 as in FIG. 2A, FIG. 3A illustrates a time sequence of slices 102, 104, 106, 108, and 110 that are transmitted across the wireless link to communicate the I-pictures from FIG. 2A. FIG. 3A is similar to FIG. 2B in that all of the slices in which image changes occur are sent to the receive side.

However, in this case, redundancies in the digital video content are identified at the macroblock level. That is, redundant macroblocks within a slice are identified. Given that redundancies in the digital video content are identified on a per-macroblock basis, the encoding can be adjusted to take advantage of the identified redundancies. For example, redundant macroblocks within a slice can be encoded as "dummy" macroblocks, which are much more efficient to compress than normal macroblocks. Referring to FIG. 3A, in the slices that are transmitted for picture N+1, all of the macroblocks that are in slices 102 and 108, but outside of the change zone 112 are fully coded while macroblocks that are in slice 108 but outside of the change zone 112 are coded as dummy blocks. In the slices that are transmitted for picture N+2, all of the macroblocks that are outside of the change zone 114 are encoded as dummy macroblocks.

FIG. 3B illustrates the slices 102, 104, 106, 108, and 110 that are used as reference slices to decode pictures N+1 and N+2. For example, portions of picture N+1 that are outside of the change zone are decoded using slices 102, 106, and 110 from picture N as reference slices and portions of picture N+2 that are outside of the change zoned are decoded using slices 102, 106, and 110 from picture N and slices 104 and 108 from picture N+1. With reference to picture N+1 in FIG. 3B, reference slice 106 from picture N is used to decode all of the dummy macroblocks that are outside of the change zone 112 in slice 106. Likewise, reference slice 106 from picture N, slice 108 from picture N+1, and slice 110 from picture N are used to decode the corresponding dummy macroblocks in slice 106, 108, and 110 of picture N+2.

As illustrated above with reference to FIGS. 2A-3B, slice-level and macroblock-level redundancy can be exploited in I-picture only encoding to identify portions of I-pictures that do not need to be transmitted across a wireless link. Because resources are not being consumed to encode and transmit redundant slices and/or macroblocks of digital video content, the encoding and transmission resources can be put to other uses that will improve the overall performance of the wireless link.

At the receive side 204, the decoder 214 decodes the received bitstream of digital video content. The slices and macroblocks of digital video content that are to be used as reference information for decoding must be stored at the receive side. Because decoded pixel information requires so much memory to store, digital video content needed for future reference is stored in its encoded format. When the digital video content is needed as reference information for the decoding of subsequent pictures, slices, or macroblocks, the stored encoded bit stream is retrieved from memory and decoded again. Because entropy encoding used to encode the bitstream relies on variable length codes, it is not possible to isolate individual codes without sequentially decoding all of the previous codes in a slice of digital video content. In the case where entropy encoding is context-adaptive, decoding a syntax element requires knowledge of previously decoded syntax elements. Additionally, intra predictions use pixels on the boundaries of previously decoded spatially neighboring macroblocks, which are not accessible without decoding a slice from the beginning.

Therefore, in order to efficiently decode I-picture only encoded digital video content, it is important to be able to rapidly switch a decoder from decoding a current bitstream to decoding a stored reference bitstream.

In an embodiment in accordance with the invention, a decoder includes an entropy decoder and an arbitrary access engine connected to the entropy decoder. The entropy decoder is configured to decode an encoded bitstream, whereby the process of decoding the encoded bitstream causes changes in state within the entropy decoder. The arbitrary access engine is configured to create access points in the encoded bitstream that is decoded by the entropy decoder. The access points are a collection of information that allows the decoder to arbitrarily access the encoded bitstream for subsequent decoding by the entropy decoder. In an embodiment, state information of the entropy decoder, decoded syntax elements, and decoded pixel information are saved in an external memory to create an access point. To synchronize the decoder with a reference bitstream, the saved state information, the saved decoded syntax elements, and the saved decoded pixel information is retrieved from the external memory. The retrieved state information is provided to the entropy decoder and the retrieved decoded syntax elements and decoded pixel information is provided to the internal memory.

Figure 4:
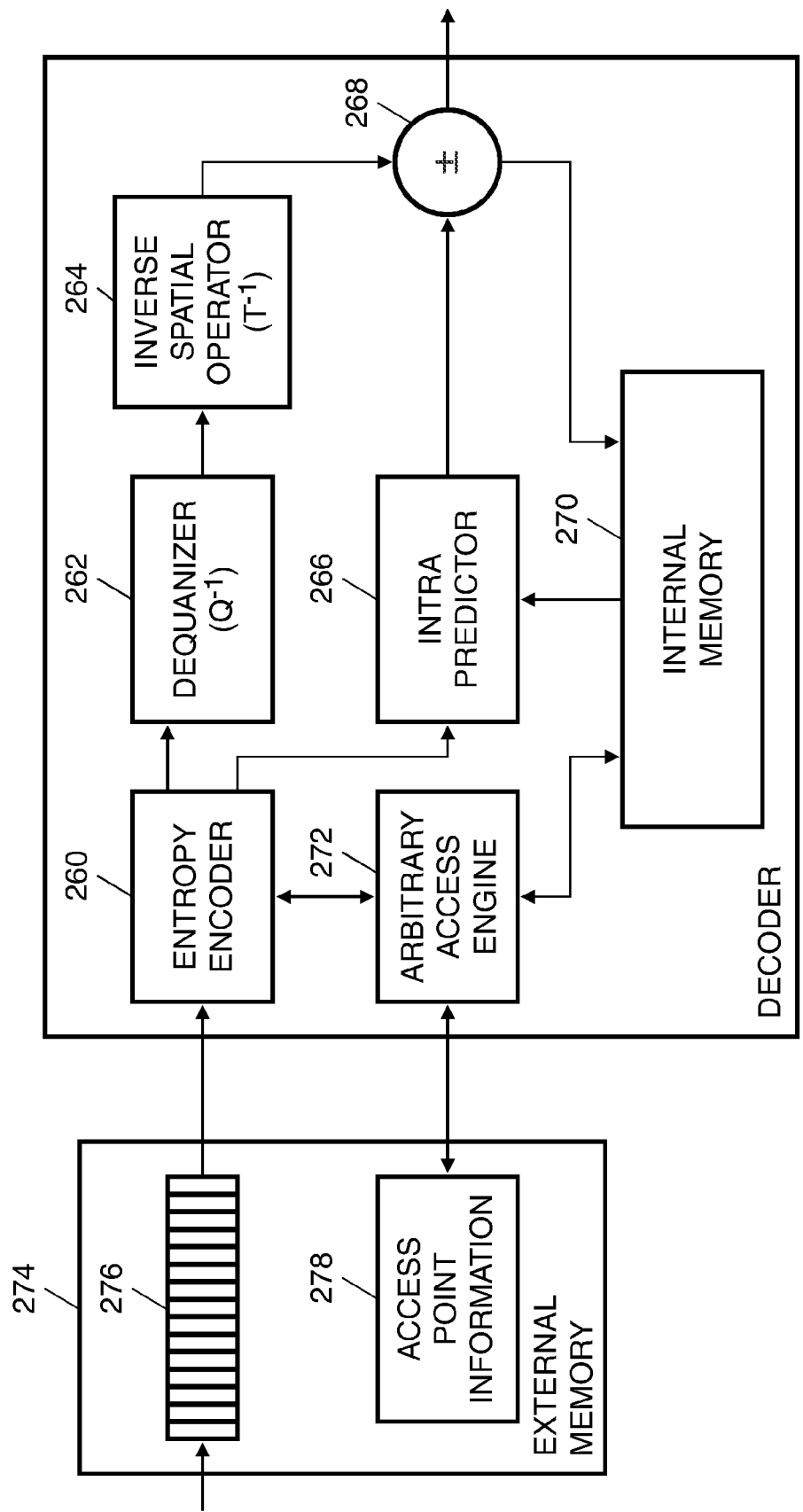
FIG. 4 depicts an embodiment of a decoder that is configured to support I-picture only decoding.

FIG. 4 depicts an embodiment of a decoder 214 that is configured to support I-picture only decoding. The decoder includes an entropy decoder 260, a dequantizer ($Q^{-1}$) 262, an inverse spatial operator ($T^{-1}$) 264, an intra predictor 266, an adder 268, internal memory 270, and an arbitrary access engine 274. The decoder is also connected to an external memory. The external memory stores the incoming bitstream 276 and stores, as is described in more detail below, state information, decoded syntax elements, and decoded pixel information. The stored access point information, including, for example, entropy encoder state information, decoded syntax elements, and decoded pixel information is identified in the external memory as access point information (API) 278. In an embodiment, the decoder is compliant with the H.264 video compression standard as defined by the International Telecommunication Union Telecommunication Standardization Sector (ITU-T).

A general description of the decoding operation is described first followed by a description of the creation of access points and the use of the access points to synchronize the decoder to a reference bitstream. With reference to FIG. 4, the bitstream 276 for the current picture that is to be decoded is stored in the external memory 274. Decoding can start only at a slice header (e.g., the resynchronization point defined by most video coding standards, such as H.264). The entropy decoder 260 reads bits from the bitstream to parse and decode the syntax elements present in the bitstream. Because context-based adaptive entropy coding is utilized, the entropy decoder needs previously decoded syntax elements, which are stored in the internal memory 270 to decode the current bitstream. The entropy decoder also saves the currently generated syntax elements in the internal memory for future use. The syntax elements corresponding to quantized transformed coefficients go through the dequantizer ($Q^{-1}$) 262 and the inverse spatial operator ($T^{-1}$) 264 to form an intra residual signal (in the form of signed pixels). The syntax elements corresponding to intra prediction modes are provided to the intra predictor 266 and the intra predictor generates prediction signals. In order to generate the prediction signals, the intra predictor uses reconstructed pixels around the currently decoded macroblock, which are read from the internal memory.

Finally, the prediction and residual signals are added to form reconstructed pixel information. Pixel information needed for future intra predictions is stored in the internal memory.

Figure 5A:
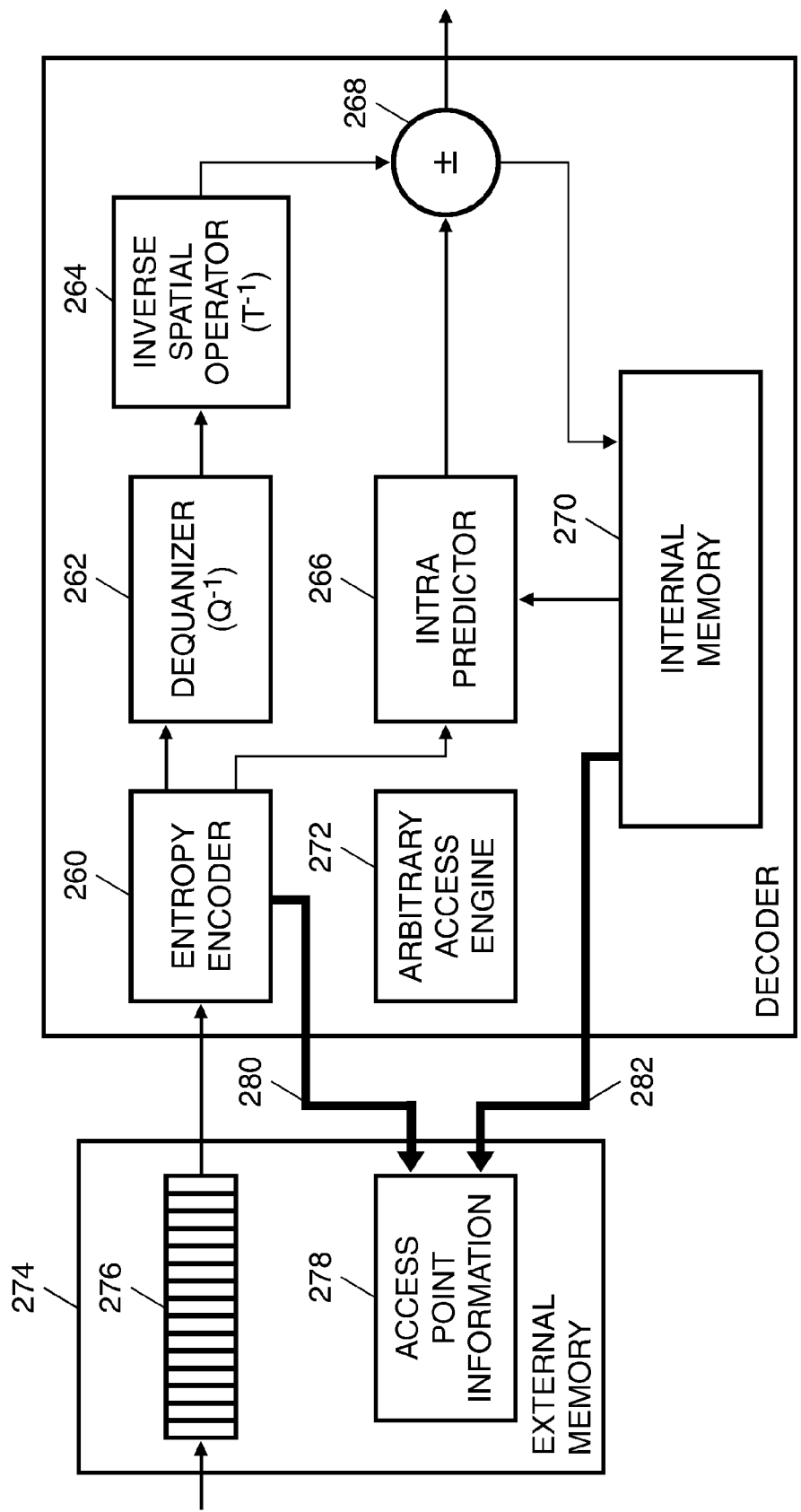
FIG. 5A illustrates the flow of information involved in creating access points in a reference bitstream.

An embodiment of the processes of creating access points to access a reference bitstream and synchronizing the decoder with the reference bitstream are now described with reference to FIGS. 5A and 5B. FIG. 5A illustrates the flow of information involved in creating access points in a reference bitstream. In operation, a bitstream of a current picture is received into the external memory 274 and fed into the entropy decoder 260 for decoding. In addition to the decoding operation, the arbitrary access engine causes internal state information to be saved. For example, at arbitrary points in the bitstream, state information related to the state of the entropy decoder is saved in the external memory, e.g., API 278. In an H.264 decoder, the state information may include, for example, the current bit position in the bitstream, the state of context-adaptive binary arithmetic coding (CABAC), context information, and bin information. The saving of state information to the external memory is indicated by arrow 280.

The arbitrary access engine also causes certain information from the internal memory 270 to be saved in the ARP module 278 of the external memory 274. For example, the information from the internal memory that is saved in the external memory may include decoded syntax elements that are needed to decode the next bits and decoded pixel information used by the intra predictor to form spatial prediction pixel information. The saving of information from the internal memory to the external memory is indicated by the arrow 282. With the entropy decoder state information, decoded syntax elements, and the decoded pixel information stored in the external memory, a rapid switch to decoding a reference bitstream can be accomplished as described below with reference to FIG. 5B.

Figure 5B:
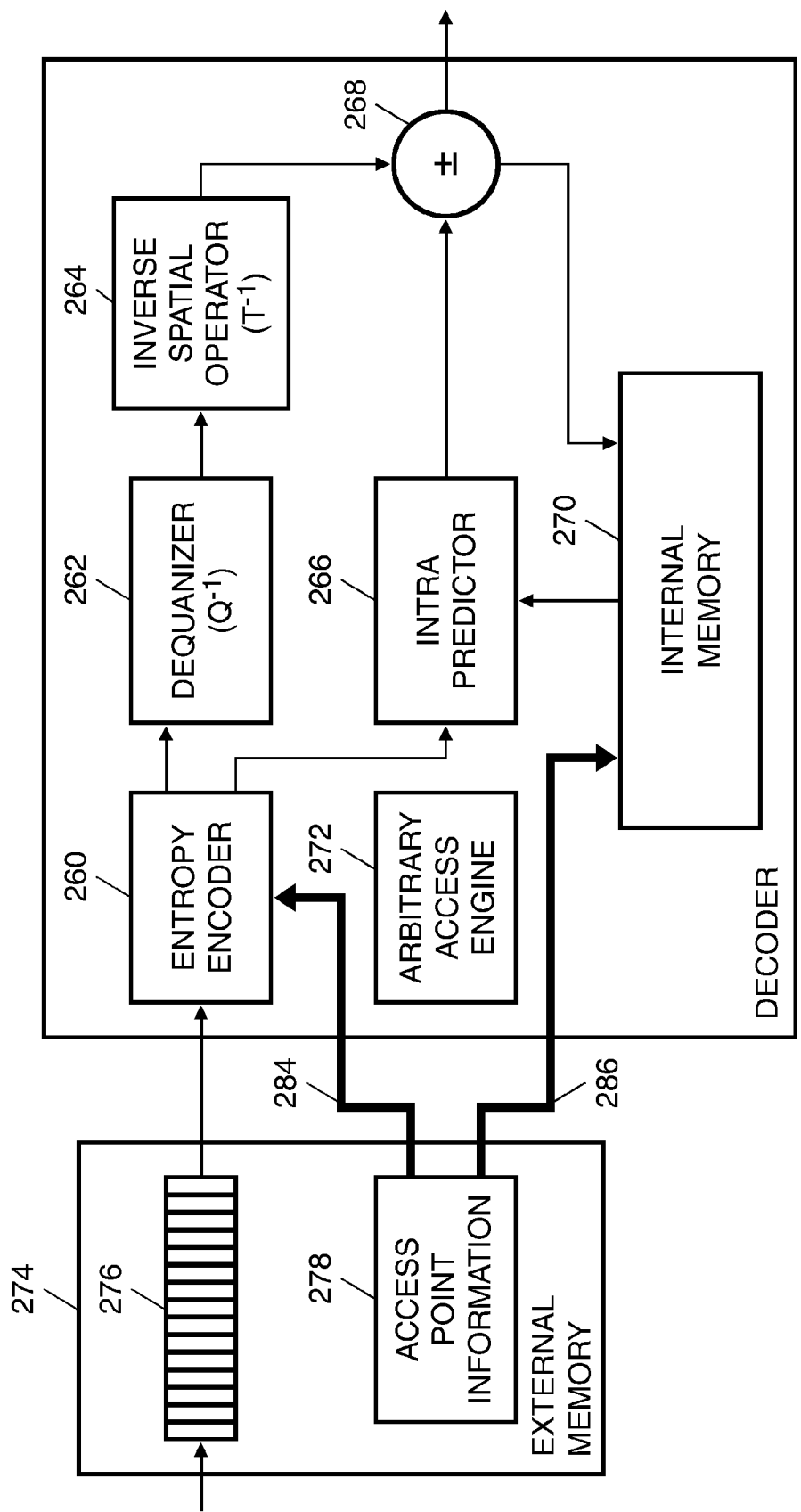
FIG. 5B illustrates the flow of information involved in synchronizing a decoder to a reference bitstream.

FIG. 5B illustrates the flow of information involved in synchronizing the decoder 214 to a reference bitstream. In operation, once there is a need to switch the decoder to decode a reference bitstream at a previously saved arbitrary access point, the arbitrary access engine causes state information related to the desired bitstream to be provided to the entropy decoder 260. In an H.264 decoder, the state information that is retrieved from the external memory 274 may include, for example, the current bit position in the bitstream, the state of context-adaptive binary arithmetic coding (CABAC), context information, and bin information. The state information enables the entropy decoder to restore its internal state to the state in which the entropy decoder existed when it was originally decoding the reference bitstream. Retrieving state information from the external memory and providing the retrieved state information to the entropy decoder is indicated by arrow 284.

The arbitrary access engine 272 also causes certain information from the external memory 274 to be provided to the internal memory 270. For example, the information provided to the internal memory includes the previously decoded syntax elements that are needed by the entropy decoder to decode the next bits and the previously decoded pixel information used by the intra prediction block to form spatial prediction pixel information. Retrieving the decoded syntax elements and the decoded pixel information from the external memory and providing the information to the internal memory is indicated by arrow 286.

With the entropy decoder state restored and the decoded syntax elements and decoded pixel information written into the internal memory, the decoder is able to rapidly switch to decoding a reference bitstream that is stored in the external memory. In an alternative embodiment, the access point information, or some portion of the access point information, can be stored in the internal memory 270. The arbitrary access engine can be embodied in hardware, software, firmware, or any combination thereof.

Figure 6:
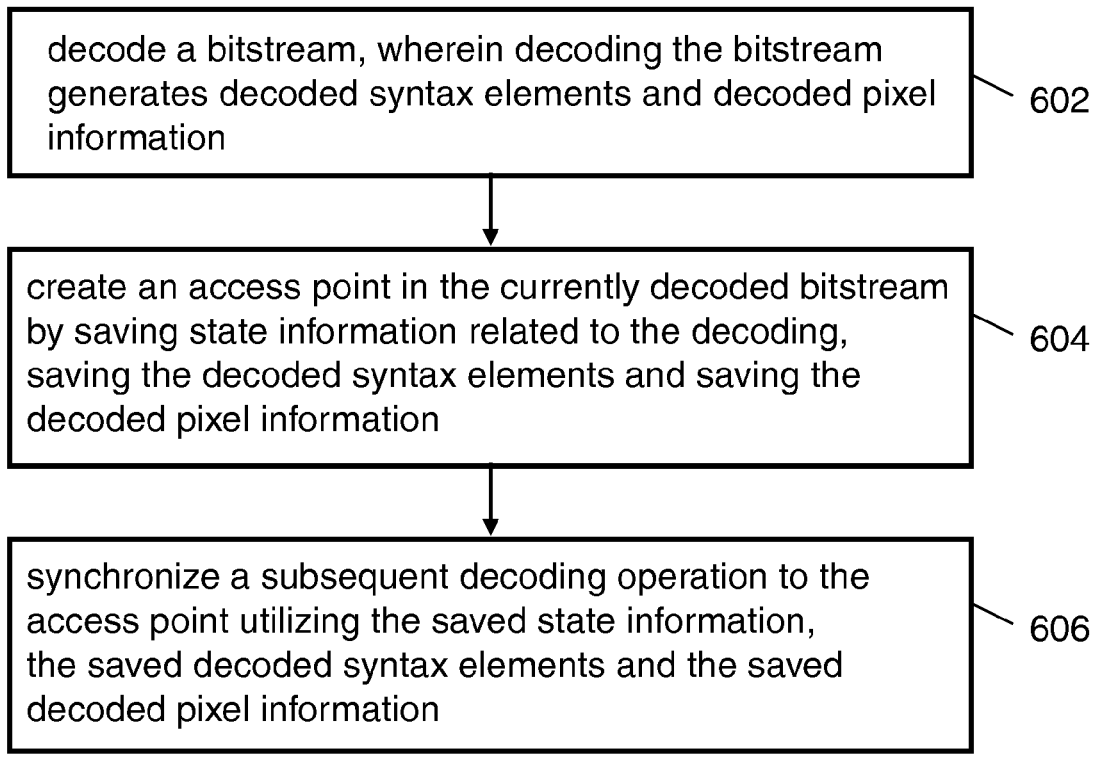
FIG. 6 depicts a process flow diagram of a method for decoding an encoded bitstream of digital video content.

FIG. 6 depicts a process flow diagram of a method for decoding an encoded bitstream of digital video content. At block 602, a bitstream is decoded, wherein decoding the bitstream generates decoded syntax elements and decoded pixel information. At block 604, an access point is created in the currently decoded bitstream by saving state information related to the decoding, saving the decoded syntax elements, and saving the decoded pixel information. At block 606, a subsequent decoding operation is synchronized to the access point utilizing the saved state information, the saved decoded syntax elements, and the saved decoded pixel information.

Although specific embodiments of the invention have been described and illustrated, the invention is not to be limited to the specific forms or arrangements of parts as described and illustrated herein. The invention is limited only by the claims.

The invention claimed is:

1. A method for decoding an I-frame only encoded bitstream of digital video content, the method comprising:
   decoding an encoded bitstream, wherein decoding the encoded bitstream generates decoded syntax elements and decoded pixel information;
   creating an access point for each slice of the encoded bitstream currently being decoded to enable re-use of the slice in different pictures by saving state information related to the decoding, saving the decoded syntax elements, and saving the decoded pixel information, wherein the saved state information comprises a bit position in the bitstream, the state of context-adaptive binary arithmetic coding, context information, and bin information;
   storing the access point and the encoded bitstream in a memory;
   synchronizing a subsequent decoding operation to the desired access point in the encoded bitstream by first retrieving the saved state information, the saved decoded syntax elements, and the saved decoded pixel information, then setting the state of an entropy decoder using the retrieved state information to restore its internal state when the related slice of the encoded bitstream was originally decoded.

2. The method of claim 1 wherein creating the access point comprises saving the state information to an external memory.

3. The method of claim 2 wherein synchronizing a subsequent decoding operation to the access point comprises retrieving the state information from the external memory.

4. The method of claim 1 wherein the saved decoded syntax elements includes decoded syntax elements of immediately neighboring macroblocks.

5. The method of claim 1 wherein the saved decoded pixel information includes a line of pixels used for intra predictions.

6. A decoder for decoding an I-frame only encoded bitstream of digital video content, the decoder comprising:
   an entropy decoder configured to decode an encoded bitstream, whereby the process of decoding the encoded bitstream causes changes in state within the entropy decoder; and
   an arbitrary access engine connected to the entropy decoder for creating and storing access points in the encoded bitstream based on the decoded bitstream, and the encoded bitstream being stored in a memory,
   wherein the access points comprise the state information related to the decoding, the decoded syntax elements, and the decoded pixel information, and the saved state information includes a bit position in the bitstream, the state of context-adaptive binary arithmetic coding, context information and bin information;
   wherein redundant slices of different pictures can be accessed and reused using the stored access points for subsequent redecoding by the entropy decoder by first retrieving the saved state information, the saved decoded syntax elements, and the saved decoded pixel information of the desired access point from the external memory, then setting the state of an entropy decoder using the retrieved state information to restore its internal state when the related slice of the encoded bitstream was originally decoded.

7. The decoder of claim 6 further comprising an external memory, wherein the arbitrary access engine is configured to direct state information of the entropy decoder, decoded syntax elements, and decoded pixel information to be saved in the external memory.

8. The decoder of claim 7 further comprising an internal memory for storing decoded syntax elements and decoded pixel information, and wherein the arbitrary access engine is further configured to have the saved decoded syntax elements and the saved decoded pixel information retrieved from the external memory and saved in the internal memory.

9. The decoder of claim 6 wherein the decoder is configured to decode an encoded bit stream that is encoded according to the H.264 video compression standard.

* * * * *